C. M. ALLEN.
FRICTION CLUTCH.
APPLICATION FILED FEB. 8, 1912.
1,137,944.
Patented May 4, 1915.
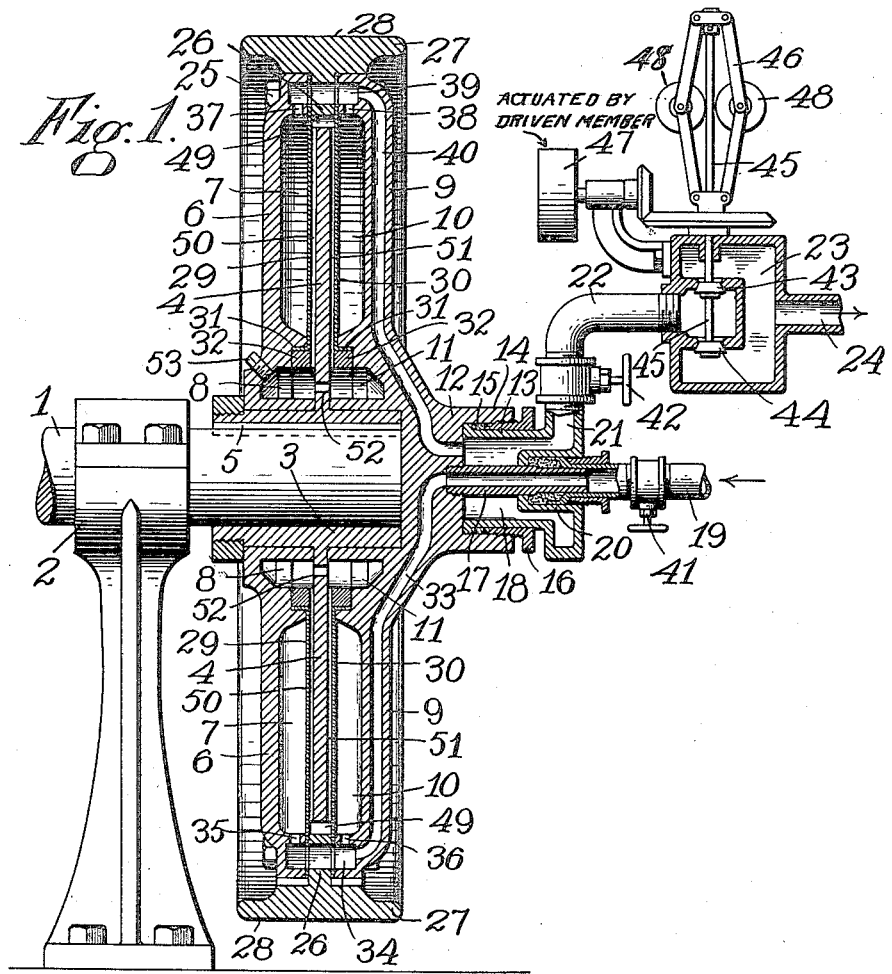
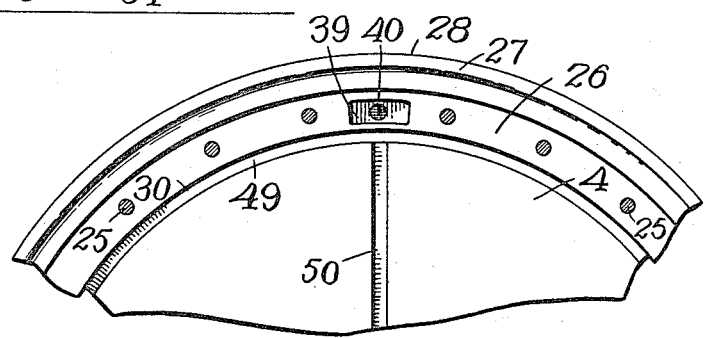
Witnesses
R. D. Tolman.
Penelope Comberbach
Inventor
Charles M. Allen.
By Rufus B. Fowler
Attorney

UNITED STATES PATENT OFFICE.

CHARLES M. ALLEN, OF WORCESTER, MASSACHUSETTS.

FRICTION-CLUTCH.

1,137,944.   Specification of Letters Patent.   Patented May 4, 1915.

Application filed February 8, 1912. Serial No. 676,455.

*To all whom it may concern:*

Be it known that I, CHARLES M. ALLEN, a citizen of the United States, residing at Worcester, in the county of Worcester and Commonwealth of Massachusetts, have invented a new and useful Improvement in Friction-Clutches, of which the following is a specification accompanied by drawings, forming a part of the same.

My present invention relates to a friction clutch in which the engagement of the clutching members is controlled by hydrostatic pressure.

The objects of my invention are, to provide for a slipping action between the clutching members, to regulate the amount of power transmitted, and to control the frictional engagement of the clutching members by the speed of the driven member. These objects among others I accomplish by the construction and arrangement of parts as hereinafter described and pointed out in the annexed claims.

Referring to the accompanying drawings, Figure 1 represents a central sectional view of a friction clutch embodying my present invention. Fig. 2 is a fragmentary side view of the friction disk and one of the inclosing cases.

Similar reference letters and figures refer to similar parts in the different views.

Referring to Fig. 1 of the drawings, 1 denotes a shaft journaled in a bearing 2. To the end of the shaft 1 I attach a hub 3 of a disk 4 by means of a key 5. Journaled upon the hub 3, on one side of the disk 4, is a casing 6 recessed on its inner side to provide an annular chamber 7, and also provided with an inner annular recess 8. On the opposite side of the disk 4 is a similar casing 9 having its inner side recessed to provide an annular chamber 10 and also having an annular recess 11. The casing 9 is journaled on the hub 3 and is itself provided with a hub 12 which incloses and is capable of rotating about a hollow fixed journal 13. The end of the hub 12 constitutes a stuffing box 14 adapted to receive a packing 15 which is compressed in the usual manner by a screw-threaded gland 16 in order to form a water tight joint between the hub 12 and the fixed bearing 13.

The hub 12 is provided with a concentric extension pipe 17 which passes through a chamber 18 inclosed in the hollow fixed journal 13, and communicates at its outer end with a water supply pipe 19. The end of the water supply pipe 19 and the outer end of the extension pipe 17 are inclosed and packed jointly in a stuffing box 20 integral with the fixed journal 13. The chamber 18 is provided with an outlet passage 21 connected by a pipe 22 with a valve chamber 23 provided with an outlet passage 24.

The peripheries of the casings 6 and 9 are secured by bolts 25 to the inner flange 26 of an annular rim 27, having a periphery 28 adapted to receive a belt, or, if desired, provided with gear teeth. The inner flange 26 forms a spacing ring between the peripheries of the casings 6 and 9. Clamped between the flange 26 and the edges of the casings 6 and 9 are annular copper disks 29 and 30, having their inner edges provided with outwardly turned flanges 31, 31, which are crowded against the casing 6 and 9 by clamping rings 32, 32.

The extension pipe 17 forms a communicating passage between the water supply pipe 19 and a cored passage 33 in the casing 9. The cored passage 33 is extended the entire side of the casing 9 and communicates at its outer end with a chamber 34 formed in the outer edges of the casings 6 and 9 extending through the copper disks 29 and 30. The chamber 34 communicates through the passages 35 and 36 with the chambers 7 and 10 upon the outer sides of the copper disks 29 and 30, thereby providing means for the introduction of water under pressure to the chambers 7 and 10. The chambers 7 and 10 communicate through passages 37 and 38 with a chamber 39, similar to the chamber 34 and formed in the outer edges of the casings 6 and 9 and extending through the inner flange 26 of the rim 27 and also through the copper disks 29 and 30. The chamber 39 communicates with a passage 40 cored in the side of the casing 9 and leading to the chamber 18 inclosed in the fixed journal 13, thereby providing for an outlet from the chambers 7 and 10 through the valve chamber 23.

The inlet and outlet passages are provided with hand-operated valves 41 and 42, by which the flow of water into and out of the apparatus may be controlled at will. The outlet passage, in addition to the valve 42 is also controlled by the balanced valves 43 and 44 attached to a valve stem 45, which is extended upward through the casing of the valve chamber 23 and is connected at its upper end with a centrifugal governor 46, capable of being rotated through a belt pulley 47, which is connected in any convenient manner, not shown, with the driven member of the clutch.

The normal position of the governor 46 serves to hold the valves 43 and 44 closed, but when the rotation of the governor exceeds a certain speed the valve stem 45 becomes depressed by the outward movement of the governor balls 48, 48, thereby opening the valves 43 and 44 and increasing the area of the outlet passage. Between the outer edge of the disk 4 and the inner edge of the flange 26 is a space 49. The space 49 communicates with the annular recesses 8 and 11 by means of radial channels 50, and 51, and the recesses 8 and 11 communicate with each other by passages 52, 52. The recesses 8 and 11 are filled with oil through an oil hole which is closed by the screw threaded plug 53. The oil contained in the recesses 8 and 11 is thrown outward through the radial channels 50 and 51 and lubricates the contacting surfaces of the disk 4 and the annular copper disks 29 and 30.

The operation of my improved clutch is as follows:—Water under pressure is admitted through the supply pipe 19, causing the chambers 7 and 10 to be filled. As the outlet passage is normally closed by the governor valves 43 and 44 the water pressure will be applied to the surfaces of the copper disks 29 and 30 to force them against the sides of the disk 4 which is keyed upon the shaft 1. If rotary motion is applied to the casings 6 and 9 by means of a belt connection on the surface 28 with a suitable motive power, the frictional contact of the disks 29 and 30 with the disk 4 will impart a rotary motion to the shaft 1, or if rotary motion be imparted to the shaft 1 it will in like manner be imparted to the casings 6 and 9, and the rim 27.

If a belt connection be established between the driven member of the clutch and the governor pulley 47, the governor 46 will be rotated, allowing the centrifugal force to throw the governor balls 48, 48, outward and depress the valve stem 45, which will open the valves 43 and 44. An exhaust flow of water from the chambers 7 and 10 is thereby established, which is constantly being supplied from the inlet passage, thereby causing any heat generated by the slipping action between the friction surfaces of the clutch to be absorbed and carried off by the exhaust flow of water from the clutch. When the rotation of the governor, as rotated by the driven member of the clutch, has reached a predetermined speed, the position of the governor balls 48, 48, will hold the governor valves 43 and 44 open sufficiently to relieve the pressure against the copper disks 29 and 30 and reduce the speed of the driven member of the clutch. An adjustment of the effective water pressure upon the disks 29 and 30 will also be accomplished by the operator by means of the hand valves 41 and 42.

I claim,

1. In a clutch, frictionally engaging driving and driven members, means for applying a liquid pressure to force said members into contact, and means actuated by the rotation of said driven member for controlling the discharge of liquid from one of said members, whereby to remove the heat generated by the friction of said members.

2. In a clutch, frictionally engaging driving and driven members, means for applying a fluid pressure to force said members into contact, means for controlling the inflow and outflow of pressure medium to and from said clutch, and independent means actuated by the rotation of said driven member for controlling the outflow of pressure medium therefrom.

3. In a clutch, driving and driven members, one of which comprises a rotatable casing carrying a pair of yielding disks, and the other a rotatable disk interposed between said yielding disks, said rotatable casing having communicating chambers opening against said yielding disks, and means for supplying a liquid under pressure to said chambers.

4. In a clutch, frictional engaging members, means for applying liquid under pressure to force said members into contact, a valve controlled outlet for the liquid applied to said frictional members, and means for varying said outlet by the speed of the driven member of the clutch.

5. In a clutch, frictional driving and driven members, means for applying a liquid pressure to force said members into contact, comprising a chamber for the liquid having inlet and outlet passages, a valve for controlling said outlet passage and a governor for actuating said valve operatively connected with the driven member of the clutch.

6. In a clutch, frictional driving and driven members, means for applying a liquid pressure to force said members into contact, comprising a chamber for the liquid having inlet and outlet passages, a valve normally closing said outlet passage, and a centrifugal governor rotated by the driven member of the clutch for opening said valve at a predetermined speed of said driven member.

7. In a clutch, driving and driven members, one of which comprises a rotatable casing carrying a pair of yielding disks and the other a rotatable disk interposed between said yielding disks, said rotatable casing having annular channels on opposite sides of said rotatable disk, and said rotatable disk having radial channels in communication with said annular channels.

CHARLES M. ALLEN.

Witnesses:
PENELOPE COMBERBACH,
NELLIE WHALEN.